Nov. 10, 1964 K. PORLAND 3,156,413

THERMOSTATICALLY-CONTROLLED RADIATOR VALVE

Filed May 15, 1962

3,156,413
THERMOSTATICALLY-CONTROLLED
RADIATOR VALVE
Kjeld Porland, Nordborg, Als, Denmark, assignor to Danfoss ved ingenior Mads Clausen, Nordborg, Als, Denmark, a Danish firm
Filed May 15, 1962, Ser. No. 194,930
Claims priority, application Denmark, Dec. 16, 1953, 4,125/53
1 Claim. (Cl. 236—42)

This application is a continuation-in-part of my application, Serial No. 475,051, filed December 14, 1954, and now abandoned.

This invention relates to a thermostatically-controlled radiator valve with a valve casing, a working bellows and a regulating bellows connected with each other, and both subjected to the action of a heat-expansible liquid.

Radiator valves of the character indicated are known, and the heat-expansible liquid is usually utilized by being inclosed in a bulb which is exposed to the temperature in relation to which the radiator valve is to be adjusted. Normally, the bulb contains the regulating bellows, and the bellows is normally connected with the working bellows in the valve casing by means of a capillary tube. In that case, the bulb may, for instance, be mounted on a wall close to the valve. However, such mounting often involves certain drawbacks. For example, the capillary tube is likely to be damaged before and after being mounted. Furthermore, it is difficult in many cases to make the bulb fit in the area around the radiator.

It is the object of the invention to provide a thermostatically-controlled radiator valve in which the valve and the bulb comprise a complete unit.

An essential feature of a thermostatically-controlled radiator valve according to the present invention is that the working bellows and the regulating bellows define a combined bellows unit. This unit is placed in a regulator casing and defines a space filled with liquid, and disposed externally is a preferably long and narrow bulb made of a material substantially non-expansible by the action of heat. The interior of the bulb is in direct communication, through a heat-insulating intermediary member, with the space defined interiorly of the bellows unit which is filled with the liquid.

The result obtained is a compact design without a capillary tube between bulb and valve, whereby the aforesaid drawbacks are eliminated. Another result is that the temperature variations of the bulb are, by the expansion and contraction of the heat-expansible liquid, transferred as pressure variations through the heat-insulating intermediary member to the inner space defined by the working bellows and the regulating bellows together, whereby these bellows are caused to extend or to contract. These variations in length may be utilized in a manner known per se for altering the adjustment of the valve and its range of regulation.

Figure 1:
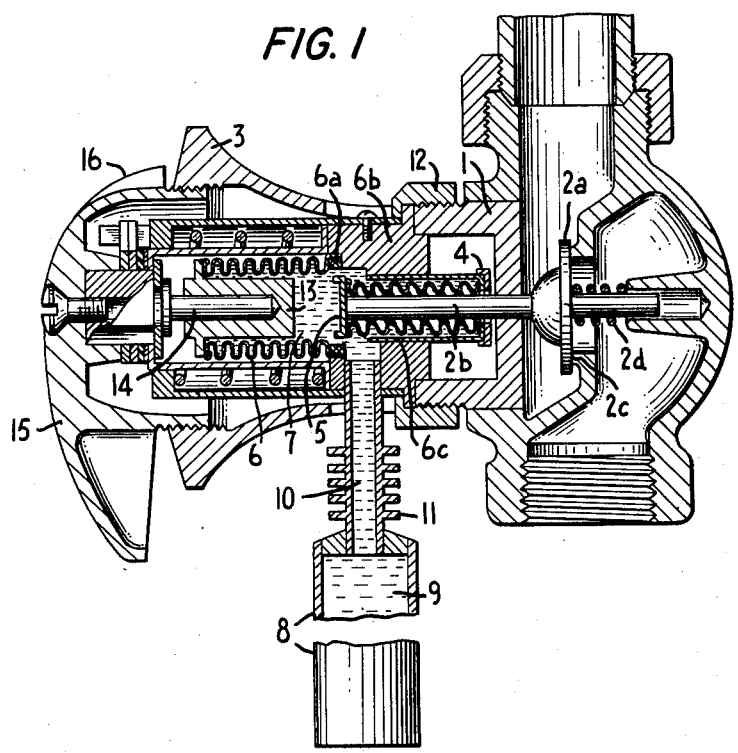
Figure 2:
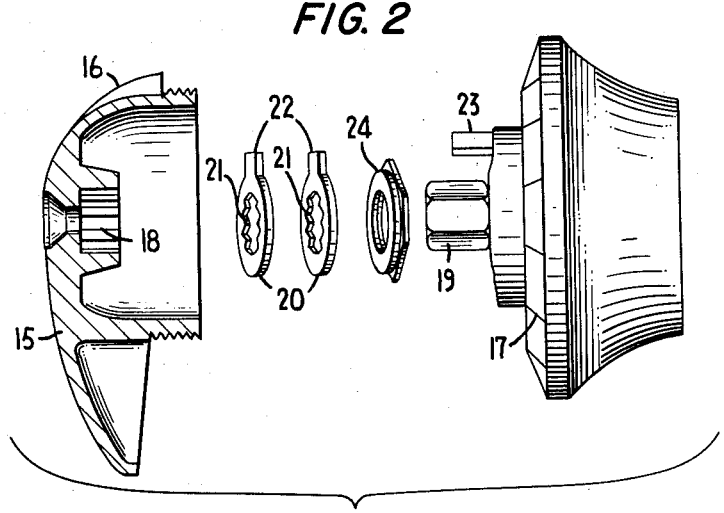

The invention will now be further described with reference to the drawing, in which FIG. 1 shows a thermostatically-controlled radiator valve in accordance with the invention, partially in section, and FIG. 2 shows a part of same with certain of its components spaced apart.

The radiator valve comprises a valve housing 1 of any known design having a valve disc 2a. The valve disc is acted upon through a valve stem 2b counteracted by resilient means, such as a spiral spring 2d and by cooperating with a valve seat 2c it regulates the water or steam circulation through the radiator and, consequently, the temperature in the room where the radiator is located. The radiator valve further comprises a regulator bonnet or casing 3 in which there is mounted a working bellows 4 which encloses the valve stem 2 and by means of its end plate 5 transmits the variations in length of the bellows 4 to a displacement member of the valve stem 2 and of the valve disc. In addition, a regulating bellows 6 connected by brazing 6a to an intermediate member 6b and a tube 6c to the working bellows 4 define a combined bellows unit which defines a space 7 filled with a heat-expansible liquid. This space is located outside a preferably long, narrow bulb 8 which is filled with the liquid and is made of a material substantially non-expansible to the action of heat. The inner space 9 of the bulb is in direct communication through a heat-insulating intermediary member 10 with the inner space 7 defined by the bellows unit. The heat-insulating intermediary member 10 consists, in an embodiment according to the invention, of a tube made of a material with a low coefficient of thermal conductivity, e.g. stainless steel. A feature of this construction is that the temperature of the bulb 8 is independent of the temperature of the valve casing and the regulator casing and depends solely on the temperature of the air surrounding the bulb 8, i.e. the room temperature. To ensure further that heat is not transmitted to the bulb 8 through the tube 10, even at high temperatures in the radiator and the valve, the tube 10 is, in accordance with the invention, provided with outer cooling fins 11 to carry off the heat of the surrounding air, thus preventing the heat from being transmitted to the bulb 8. In order to avoid the possibility of heat being transmitted from the bellows unit to the bulb 8 by convection in the liquid, the bulb 8 is disposed so as to have its longer dimension substantially vertically beneath the bellows unit, the tube 10 having, in addition, a substantially smaller inside diameter than the inner space 9. The result is that the heated part of the liquid remains in the bellows unit without being mixed with that part of the liquid which is inside the bulb 8. The regulator casing 3 with the bellows unit mounted therein is mounted on the valve housing 1 in such manner that it can be replaced, the bulb 8 and the greater part of the intermediary member 10 projecting from out of the casing. As a result, the regulator casing 3 and the two combined bellows 4, 6 may easily be replaced as a separate unit, for instance, when forwarding and mounting the radiator, the regulator casing with the bulb not being attached to the valve casing until the radiator has been mounted. As a further advantage, the valve may, if desired, first be provided with members, for example a handle, for manual regulation, and may be provided later with thermostatic regulation.

In accordance with the invention, the regulator housing 3 is fastened to the valve casing 1 by means of a union nut 12, whereby the regulator casing 3, and with it the bulb 8, may be turned so that the bulb 8 is brought into its proper vertical position. In accordance with the invention, the regulating bellows 6 has at a distal end opposite that facing the working bellows 4 an attached threaded bushing 13 adapted to be displaced by a regulating spindle 14 which engages the threading of the bushing 13 and supports an adjustment member 15 provided with a pointer 16 which points at a scale 17 formed in or mounted on the regulator casing 3. Consequently a definite manual setting of the regulating spindle 14 may be made to correspond with definite indications on the scale 17. The settings, of course, vary the volume of the space 7. The adjustment member 15 is, according to the invention, provided with a multi-edged central hole 18 whose inwardly-extending edges are disposed so as to conform to the outwardly-extending edges of a multi-edged nut 19 which is attached to the regulating spindle 14, the number of edges of the hole 18 being a whole multiple of the number of edges of the nut 19. As a result, the adjustment member 15 may, on adjustment of the radiator valve, be placed in such manner as to provide conformity between the indications on the scale 17, which, for example, may have centrigrade graduations, and the room temperature established when the valve regulates the water or stream circulation of the radiator. The nut 19 is, according to the invention, provided with at least one stop plate 20 with a central hole 21 whose inwardly-extending edges conform to the outwardly-extending edges of the nut 19, the number of edges of the hole being a whole multiple of the number of edges of the nut 19. Between the stop plates 20 and the regulator casing 3 are positioned spring washers 24. The stop plate is, moreover, provided with an abutment lap 22 adapted to co-operate with a permanent stop 23 on the regulator casing 3.

The advantages obtained are the following:

(a) On adjustment, the valve can be set and locked at a definite desired temperature, which is of importance in preventing anyone from interfering with the adjustment of the valve.

(b) The valve can be adjusted in such manner that it can be regulated manually to a predetermined maximum temperature, but not beyond this temperature, (c) The valve can be adjusted by manual regulation between two fixed outer limits, e.g., a maximum temperature and a minimum temperature, (d) The valve can be set by manual regulation over the entire temperature range, for example from $+3°$ C. to $+25°$ C.

The radiator valve operates as follows:

As long as the room temperature, that is, the temperature of the air surrounding the bulb, is lower than that at which the valve is adjusted, the liquid pressure in the bulb and in the bellows unit will be low, and by reason of its action on the valve stem the working bellows 4 consequently will adjust the valve at full open position for the circulation of steam or water through the radiator so as to heat the room where the radiator is installed. The temperature of the bulb, and consequently the liquid pressure, will rise with a rising room temperature, whereby the working bellows will be more and more compressed and the valve will restrict more and more the circulation of water or steam until the heat transmitted to the room through the radiator is in equilibrium with the heat given off by the room itself to its surroundings, e.g., by transmission, radiation or convection, when the temperature will be substantially constant. The radiator valve therefore ensures that the room is supplied with just the amount of heat consumed, resulting in increased comfort for the persons in the room and at the same time effecting an improved fuel economy, since, otherwise, too much heat is generally relieved by an excessive supply of fresh air, e.g., through open windows.

When mounted, the adjustment valve is adjusted for direct reading of the constant room temperature on the scale of the valve. However, this temperature may be changed by manual turning of the adjustment member 15.

Anyone skilled in the art will understand that a thermostatically-controlled radiator valve such as that disclosed in the foregoing affords the ideal regulation of the temperature in homes, business offices, assembly rooms, schools, hospitals and similar places otherwise subject to wide variations in temperature, and it is of such simple design that it may be operated even by the unskilled, the adjustment member having only to be set at the figure corresponding to the desired temperature.

It will be understood that various changes and modifications may be made in the embodiment described above and illustrated in the drawing without departing from the scope of the invention as defined in the appended claim. It is intended, therefore, that all matter contained in the foregoing description and in the drawing shall be interpreted as illustrative only and not as limitative of the invention.

I claim:

In a thermostatically-controlled radiator valve for variably controlling in operation flow of a fluid heating medium through a radiator comprising a valve body having a valve seat and a valve member actuatable into a seated position on said seat closing said valve and an unseated position opening the valve to allow said heating medium to flow therethrough, a valve stem on said valve member extending outwardly through an aperture in said valve body, valve-actuating means mountable on said valve body for automatically closing said valve and opening it in response to ambient temperature variations in the vicinity of said valve and for opening said valve proportionately to temperature differences between said ambient temperature and a selected temperature, said valve-actuating means comprising a bonnet, an actuating first bellows in said bonnet having a closed free end releasably engageable with said valve stem for actuation of said valve stem axially in two opposite directions in direct proportion to the expansion and contraction of said first bellows, a regulating second bellows having a free end which is closed disposed distal to said first bellows closed end spaced axially therefrom, means in said bonnet comprising said first and second bellows jointly defining intermediate said opposed closed ends of said bellows a control space the volume of which is varied as said first and second bellows expand and contract, an elongated bulb disposed externally of said housing depending therefrom and having a longitudinal axis disposed in operation in a vertical position, a rigid tube coaxial with said longitudinal axis and having a substantially uniform internal bore with a uniform diameter providing communication between said bulb and said space and rigidly mounting said bulb in close proximity to said valve housing, said internal diameter being substantially smaller than the internal diameter of said bulb, said tube being made of a material having a relatively low coefficient of heat transfer, a liquid filling said bulb, tube, and space, said liquid having the characteristic of varying in volume in response to temperature variations sensed by said bulb, resilient means in said valve body biasing said valve member to an unseated position for working in opposition to contraction of said working first bellows caused by pressure exerted by said liquid in said space and tending to seat said valve member when said valve-actuating means is mounted on said valve body, a bushing internally of said regulating second bellows for variably adjusting the axial position of the closed end of said second bellows relative to said closed end of said first bellows, means comprising a threaded regulating spindle extending into said regulating bellows and outwardly of said bonnet for varying the axial position of said bushing thereby to vary the axial position of the closed end of said regulating second bellows and to adjustably and variably define the volume of said space and set said volume at different selected given volumes, said first and second bellows being disposed coaxially in a plane normal to said longitudinal axis of said bulb, a union nut for removably mounting said bonnet on said valve body, whereby said valve body with said seat, said valve member and stem is installable separately on said radiator and said valve-actuating means comprising the bonnet and first and second bellows and associated bulb are selectively installable subsequently for automatic control by said liquid.

(References on following page)

References Cited by the Examiner
UNITED STATES PATENTS

| | | | |
|---|---|---|---|
| 1,285,990 | 11/18 | Halsey | 236—42 |
| 1,659,917 | 2/28 | Lawler | 236—42 |
| 1,916,814 | 7/33 | Shivers | 236—42 |
| 1,925,530 | 9/33 | Gotthardt | 236—99 |
| 1,941,359 | 12/33 | Lawler | 236—42 |
| 1,988,776 | 1/35 | Berghdefer | 236—99 |
| 2,205,334 | 6/40 | Barnes | 236—99 |
| 2,507,911 | 5/50 | Keller | 223—99 |
| 2,857,106 | 10/58 | Porland | 236—99 X |

FOREIGN PATENTS 833,361  7/38  France.

EDWARD J. MICHAEL, *Primary Examiner.*
ALDEN D. STEWART, *Examiner.*